(12) United States Patent
Ohwa et al.

(10) Patent No.: US 9,600,498 B2
(45) Date of Patent: Mar. 21, 2017

(54) INFORMATION PROCESSING APPARATUS, INFORMATION PROCESSING METHOD, AND PROGRAM

(75) Inventors: Tsunayuki Ohwa, Kanagawa (JP); Satoru Inoue, Tokyo (JP); Nariaki Satoh, Kanagawa (JP); Shinji Yuhara, Tokyo (JP); Daiki Ito, Kanagawa (JP); Takayuki Usami, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 1101 days.

(21) Appl. No.: 12/693,979

(22) Filed: Jan. 26, 2010

(65) Prior Publication Data

US 2010/0188421 A1 Jul. 29, 2010

(30) Foreign Application Priority Data

Jan. 28, 2009 (JP) ................................. 2009-016223

(51) Int. Cl.
*G06F 17/30* (2006.01)
(52) U.S. Cl.
CPC ............................ *G06F 17/30265* (2013.01)
(58) Field of Classification Search
None
See application file for complete search history.

(56) References Cited

U.S. PATENT DOCUMENTS

| 5,777,605 | A * | 7/1998 | Yoshinobu et al. | 345/173 |
| 7,643,818 | B2 * | 1/2010 | Backholm et al. | 455/412.1 |
| 8,166,019 | B1 * | 4/2012 | Lee et al. | 707/708 |
| 2003/0233419 | A1 * | 12/2003 | Beringer | 709/206 |
| 2006/0259511 | A1 * | 11/2006 | Boerries et al. | 707/103 R |
| 2007/0143414 | A1 * | 6/2007 | Daigle | 709/206 |
| 2007/0271347 | A1 * | 11/2007 | Logue et al. | 709/206 |
| 2008/0005355 | A1 * | 1/2008 | Craft et al. | 709/245 |

(Continued)

FOREIGN PATENT DOCUMENTS

| JP | 2002-189689 | 7/2002 |
| JP | 2004-164557 | 6/2004 |

(Continued)

OTHER PUBLICATIONS

Anne Troy, "Column Headings in Microsoft Outlook", 2005-2006, URL: http://www.officearticles.com/outlook/column_headings_in_microsoft_outlook.htm.*

*Primary Examiner* — David H Chu
(74) *Attorney, Agent, or Firm* — Oblon, McClelland, Maier & Neustadt, L.L.P.

(57) ABSTRACT

An information processing apparatus includes a storage section and a control section. The storage section stores a plurality of templates having different predetermined designs with template attribute information, the plurality of templates each being applied to a display of a content including at least one of a document and an image with the content being laid out on the template. The control section performs a matching processing of component information, as a search key, of the content with the template attribute information, and selects, as a template corresponding to the content to be applied to the display of the content, a template whose template attribute information has a higher match rate than others.

20 Claims, 11 Drawing Sheets

(56) References Cited

U.S. PATENT DOCUMENTS

| | | | |
|---|---|---|---|
| 2009/0061827 A1* | 3/2009 | Bulgin et al. | 455/413 |
| 2009/0094668 A1* | 4/2009 | Corbin et al. | 726/1 |
| 2009/0106650 A1* | 4/2009 | Haynes et al. | 715/255 |

FOREIGN PATENT DOCUMENTS

| | | |
|---|---|---|
| JP | 2004-274260 | 9/2004 |
| JP | 2005-190269 | 7/2005 |
| JP | 2005-340987 | 12/2005 |
| JP | 2006-338592 | 12/2006 |
| JP | 2007-052559 | 3/2007 |
| JP | 2008-041081 | 2/2008 |

\* cited by examiner

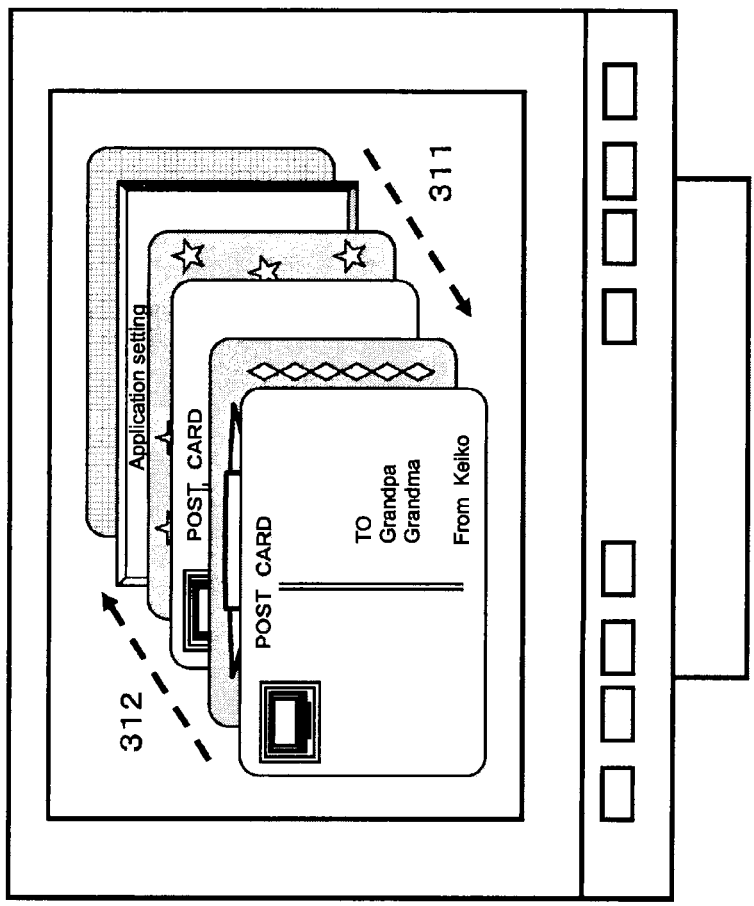
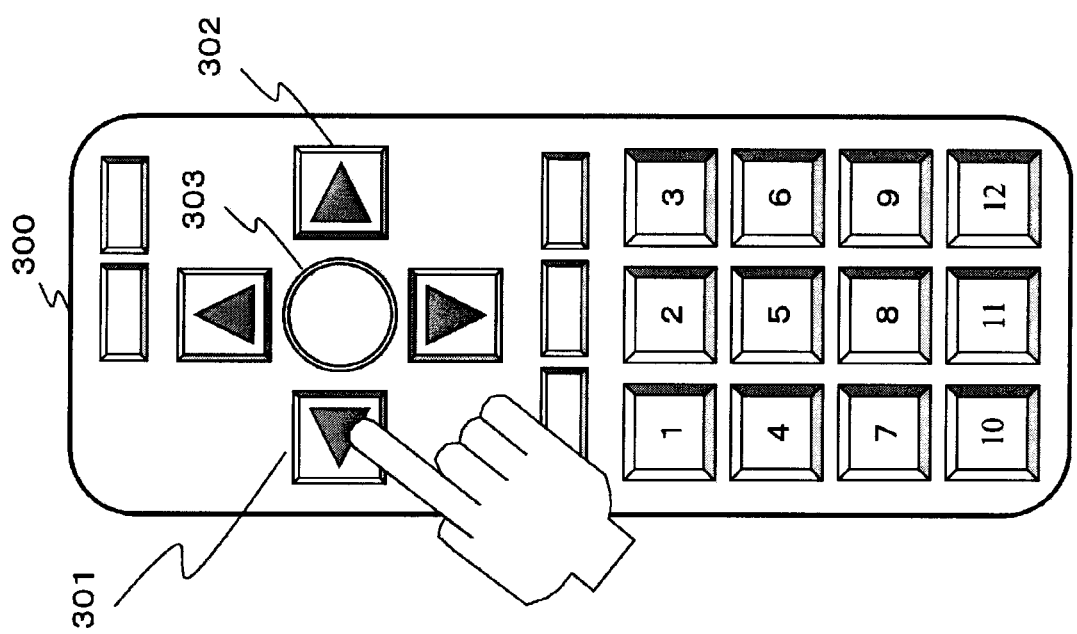
FIG.5

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program. Specifically, the present invention relates to an information processing apparatus, an information processing method, and a program that are applied to a system for displaying image data of a picture or the like taken by a user on a display apparatus such as a remotely-located television, for example.

2. Description of the Related Art

Image data of a picture taken by a user can be transmitted with the image data being attached to a communication message via, e.g., a network. This processing enables the image data to be displayed on a remotely-located display apparatus such as a PC and a television and viewed. It should be noted that a viewing system and transmission/reception of image data via a network in related art are disclosed in Japanese Patent Application Laid-open Nos. 2004-274260 and 2007-52559, for example.

Nowadays, there is used a message transmission/reception system that can perform, when an apparatus receives a message, a reception notification for notifying a user of the fact that the message is received. But, the user cannot get a content of an image attached to the received message without opening the message.

For example, a message list that is a list of received messages is displayed on a display of the apparatus that has received the message. However, the message list only shows titles of the messages and information items on senders of the messages, and therefore the user cannot get the content of the image included in the message. To get the content of the image attached to the message, the user has to select a specific message from the message list and open the message selected.

For example, in a state where a large number of messages to which images are attached are received and listed in the message list, even when the user wants to view only one image among those images, the user has to sequentially select and open the messages one by one and confirm the images attached to the messages one by one. This process causes a problem of increasing a burden on the user.

SUMMARY OF THE INVENTION

In view of the above-mentioned circumstances, it is desirable to provide an information processing apparatus, an information processing method, and a program that make it possible to efficiently confirm the image attached to the message, which reduce the burden on the user.

According to an embodiment of the present invention, there is provided an information processing apparatus including a storage section and a control section. The storage section stores a plurality of templates with template attribute information, the plurality of templates having different predetermined designs and each being applied to a display of a content including at least one of a document and an image with the content being laid out on the template. The control section performs a matching processing of component information, as a search key, of the content with the template attribute information, and select, as a template corresponding to the content to be applied to the display of the content, a template whose template attribute information has a higher match rate than others.

Further, in the information processing apparatus according to the embodiment of the present invention, the control section extracts a search keyword from document information included in the content, performs the matching processing of the extracted search keyword with data included in the template attribute information, and selects, as the template corresponding to the content to be applied to the display of the content, the template whose template attribute information has the higher match rate than the others.

Further, in the information processing apparatus according to the embodiment of the present invention, the control section extracts metadata of the image included in the content, performs the matching processing of the extracted metadata with data included in the template attribute information, and selects, as the template corresponding to the content to be applied to the display of the content, the template whose template attribute information has the higher match rate than the others.

Further, in the information processing apparatus according to the embodiment of the present invention, the metadata of the image is image-taking date and time information of the image included in the content. The control section performs the matching processing of the image-taking date and time information with the data included in the template attribute information, and selects, as the template corresponding to the content to be applied to the display of the content, the template whose attribute information is judged to be one of the same image-taking date and time information and a similar image-taking date and time information.

Further, in the information processing apparatus according to the embodiment of the present invention, the metadata of the image is image-taking positional information of the image included in the content. The control section performs the matching processing of the image-taking positional information with the data included in the template attribute information, and selects, as the template corresponding to the content to be applied to the display of the content, the template whose attribute information is judged to be one of the same image-taking positional information and a similar image-taking positional information.

Further, the information processing apparatus according to the embodiment of the present invention being a relay server for a message that is transmitted and received among a plurality of communication apparatuses. The control section performs the matching processing of the component information, as the search key, of the message received from a message transmission apparatus with the template attribute information, selects, as the template corresponding to the content to be applied to the display of the content, the template whose template attribute information has the higher match rate than the others, and provides, to a message reception apparatus, display data in a form of a post card in which the component information of the message is laid out on the selected template.

According to another embodiment of the present invention, there is provided an information processing method executed in an information processing apparatus. The information processing method includes selecting, by a control section, a template to be applied to a display of a content including at least one of a document and an image, with the content being laid out on the template, the template having a predetermined design. The selecting the template includes extracting a search key from component information of the content, performing a matching processing of the search key with template attribute information, and selecting, as a template corresponding to the content to be applied to the display of the content, a template whose template attribute information has a higher match rate than others in the matching processing.

According to another embodiment of the present invention, there is provided a program for causing an information processing apparatus to execute an information processing. The program includes causing a control section to select a template to be applied to a display of a content including at least one of a document and an image, with the content being laid out on the template, the template having a predetermined design. The causing the control section to select the template includes extracting a search key from component information of the content, performing a matching processing of the search key with template attribute information, and selecting, as a template corresponding to the content to be applied to the display of the content, a template whose template attribute information has a higher match rate than others in the matching processing.

It should be noted that the program according to the embodiment of the present invention can be provided to a computer system or an information processing apparatus that can execute various program codes, through a storage medium or a communication medium in a computer-readable form. By providing the programs in the computer-readable form, processings in accordance with the programs are implemented on the information processing apparatus or the computer system.

These and other objects, features and advantages of the present invention will become more apparent in light of the following detailed description of best mode embodiments thereof, as illustrated in the accompanying drawings. It should be noted that the system in this specification refers to a logical composite structure of the plurality of apparatuses. Therefore, the apparatuses of respective structures are not limited to be disposed in the same casing.

With the structure according to the embodiments of the present invention, for example, performed is the processing of selecting the optimal template to be applied to the display of the content including the document and the image, such as the message or the like transmitted and received via the network or the like with the content being laid out on the template having the predetermined template. The component information of the content included in the message or the like, such as the word, the image-taking date and time information, and the image-taking positional information, is extracted, and the matching processing of the information items, as the search key, with the template attribute information is performed. As a result, the template whose template attribute information has the higher match rate than the other templates is selected as the template corresponding to the template to be applied to the display of the content. Through the above processing, the optimal template for the content display of the message or the like can be selected.

BRIEF DESCRIPTION OF DRAWINGS

FIG. 5 is a diagram for explaining a remote controller used on the data display apparatus side and an example of a processing performed by using the remote controller;

DESCRIPTION OF PREFERRED EMBODIMENTS

Figure 1:
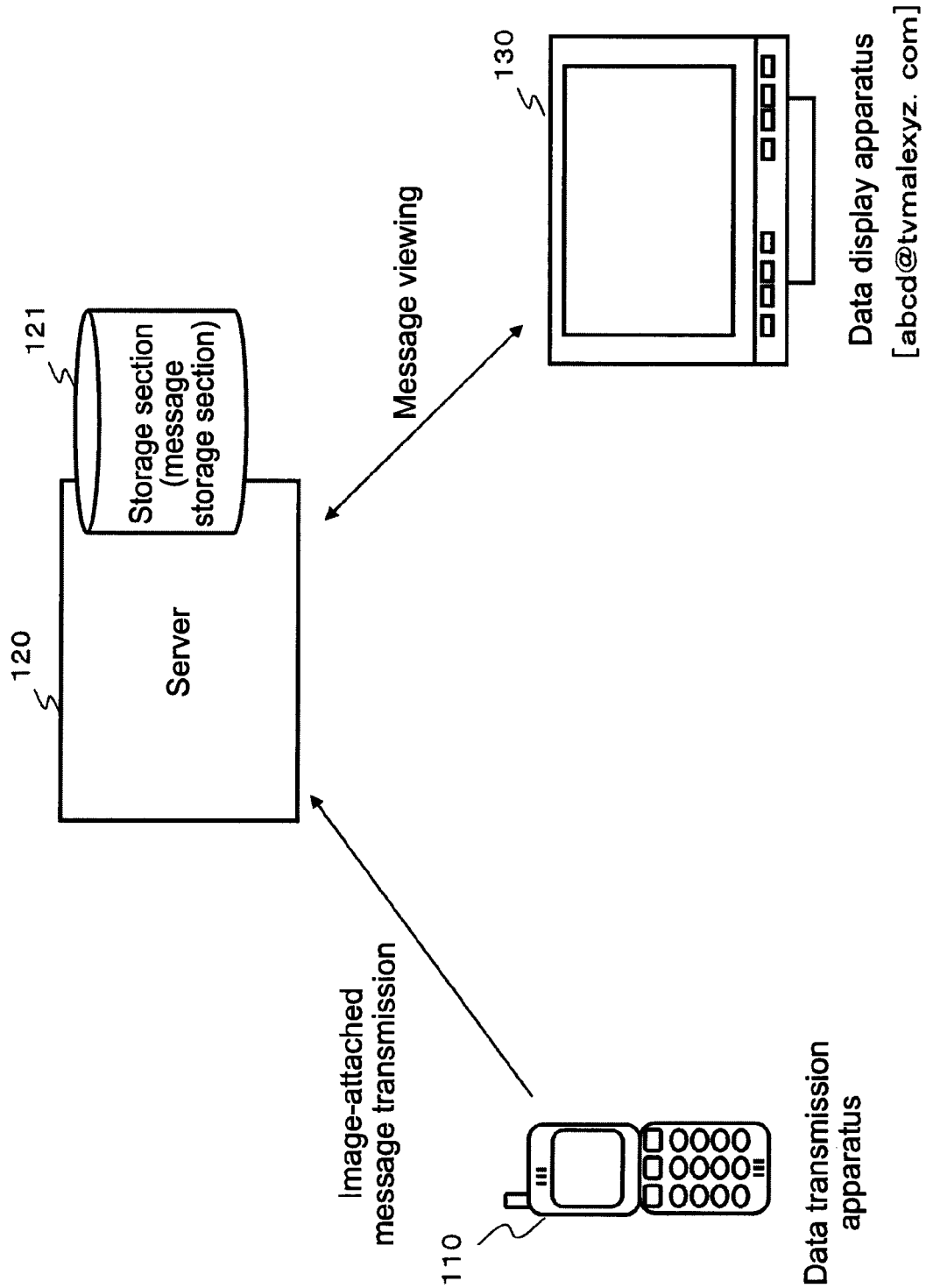
FIG. 1 is a diagram showing an example of a structure of an information processing system according to an embodiment of the present invention.

Hereinafter, an information processing apparatus, an information processing method, and a program according to an embodiment of the present invention will be described in detail with reference to the drawings. It should be noted that the description will be given in the order of the following items.

1. Structural example of information processing system that performs message transmission/reception
2. Communication sequence example between apparatuses that perform message transmission/reception
3. Display data in data display apparatus and example of processing with respect to display data
4. Selection processing of template corresponding to message
5. Regarding hardware structure of each apparatus (1. Structural Example of Information Processing System that performs Message Transmission/Reception)

FIG. 1 is a diagram showing a structural example of an information processing system according to the embodiment of the present invention. As shown in FIG. 1, the information processing system includes a data transmission apparatus 110 such as a cellular phone, a server 120, and a data display apparatus 130 such as a television. The data transmission apparatus 110, the server 120, and the data display apparatus 130 each have a function to perform communication via a wireless or wired network.

The data transmission apparatus 110 performs a message transmission processing, and the data display apparatus 130 performs a processing of receiving and displaying a message transmitted from the data transmission apparatus 110. The server 120 performs a relay processing of a message between the data transmission apparatus 110 and the data display apparatus 130.

The data transmission apparatus 110 has a camera function for taking a still image, a moving image, or the like and performs a processing of attaching a taken image to the message, setting an address of a message transmission destination, and transmitting the message. In FIG. 1, an apparatus set as the message transmission destination is the data display apparatus 130.

The data transmission apparatus 110 creates an image-attached message in accordance with a predetermined format and transmits the message. The message format is a format to which the following information can be input or set, for example.

Message transmission destination information (To): for example, "Grandpa and grandma"

Message transmission source information (From): for example, "Keiko"

Message main body: for example, "How are you . . . "

Image attached to message: for example, one to three pictures

Message transmission source address

Message transmission destination address

The data transmission apparatus 110 creates the image-attached message in accordance with the predetermined format as described above and transmits the message.

The transmitted message is received by the server 120. Upon reception of the transmitted message from the data transmission apparatus 110, the server 120 stores the received message in a storage section 121 thereof. To the message transmitted by the data transmission apparatus 110, the message transmission destination address that indicates the message transmission destination is set. The server 120 stores received messages in the storage section 121 for each message transmission destination address.

The storage section 121 managed by the server 120 has storage areas previously sectioned for each message transmission destination address, and the server 120 organizes the received messages for each message transmission destination address and stores the messages in the storage section 121. It should be noted that at least one piece of image data is attached to each of the received messages.

The data display apparatus 130 is an apparatus having the message transmission destination address that is set to the transmitted message of the data transmission apparatus 110. The data display apparatus 130 holds, in a storage section thereof, a message processing application that is a program for receiving and viewing the message.

By performing the message processing application, the data display apparatus 130 can obtain, from the server 120, the message that the server 120 has received, and can display the message. It should be noted that the data display apparatus 130 and the server 120 are connected with each other via a network such as the Internet.

As a preparation for performing the message processing application, the data display apparatus 130 performs, on the server 120, a service registration processing including various setting processings such as registration of an address of the data display apparatus 130.

For example, as shown in FIG. 1, an address of "abcd@tvmalexyz.com" is registered to the server 120 as the address of the data display apparatus 130. The server 120 secures a message storage area in the storage section 121 for each address registered.

The server 120 confirms the message transmission destination address of the message transmitted from the data transmission apparatus 110. When the message transmission destination address coincides with an address registered, the server 120 stores data of the received message in the storage section 121.

Figure 2:
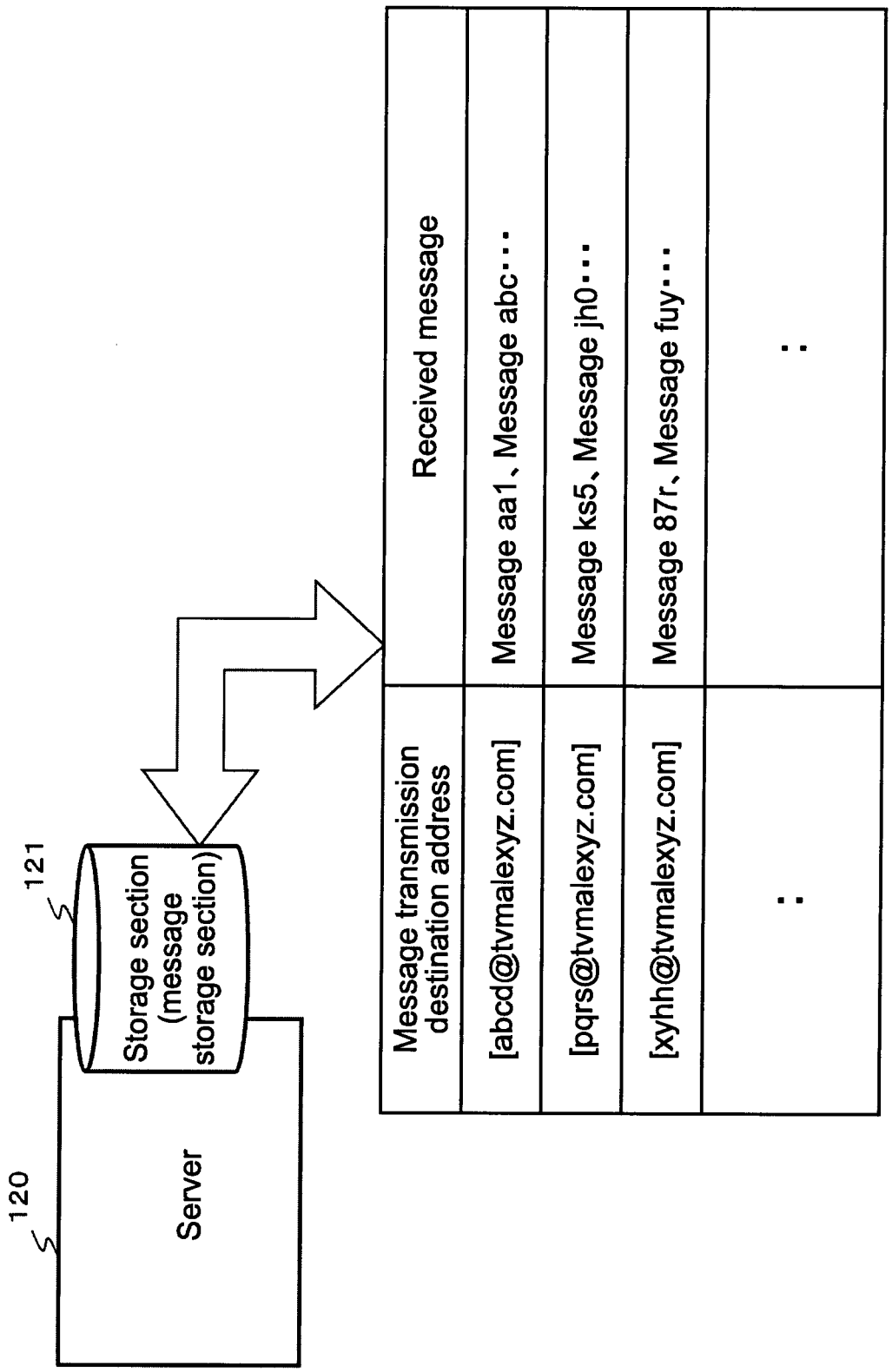
FIG. 2 is a diagram for explaining an example of a structure of data stored in a storage section by a server.

FIG. 2 is a diagram showing a message storage example of the storage section 121. As shown in FIG. 2, the server 120 secures the message storage areas in the storage section 121 for each message transmission destination address registered, and stores the received message in the storage area corresponding to the message transmission destination address.

The data display apparatus 130 performs a polling processing to access the server 120 at predetermined time intervals and confirms whether a new message has reached the apparatus itself (data display apparatus 130). In a case where the new message has reached the apparatus itself (data display apparatus 130), the server 120 notifies the data display apparatus 130 of the fact that the new message has reached the data display apparatus 130 and displays the notification of "you've got a new mail" on the data display apparatus 130, for example.

For example, the user who is watching a TV program on the data display apparatus 130 gets the notification and can confirm that the new message has arrived. When the user wants to view the message, a message processing application is started, and the message stored in the storage section 121 of the server 120 is obtained and displayed.

It should be noted that, regardless of whether the new message has arrived or not, the data display apparatus 130 can start the message processing application at an arbitrary timing and obtain and display the message stored in the storage section 121 of the server 120.

The server 120 creates and provides display data (post card) in a form in which a read message whose content has already been confirmed by the user on the data display apparatus 130 side and an unread message whose content is not confirmed yet are distinguished from each other. A specific example of the display data will be described in detail below. The read message is provided to the data display apparatus 130 as the post card (A side of post card) in which a message main body (text) included in the message and an image such as a picture attached to the message are disposed on a predetermined template, for example.

Further, the unread message is provided to the data display apparatus 130 as display data in a form of the post card (B side of post card) in which only the following message transmission destination/source information is displayed.

Message transmission destination information (To): for example, "Grandpa and grandma"

Message transmission source information (From): for example, "Keiko"

The specific processing example thereof will be described below.

(2. Communication Sequence Example Between Apparatuses that Perform Message Transmission/Reception)

Figure 3:
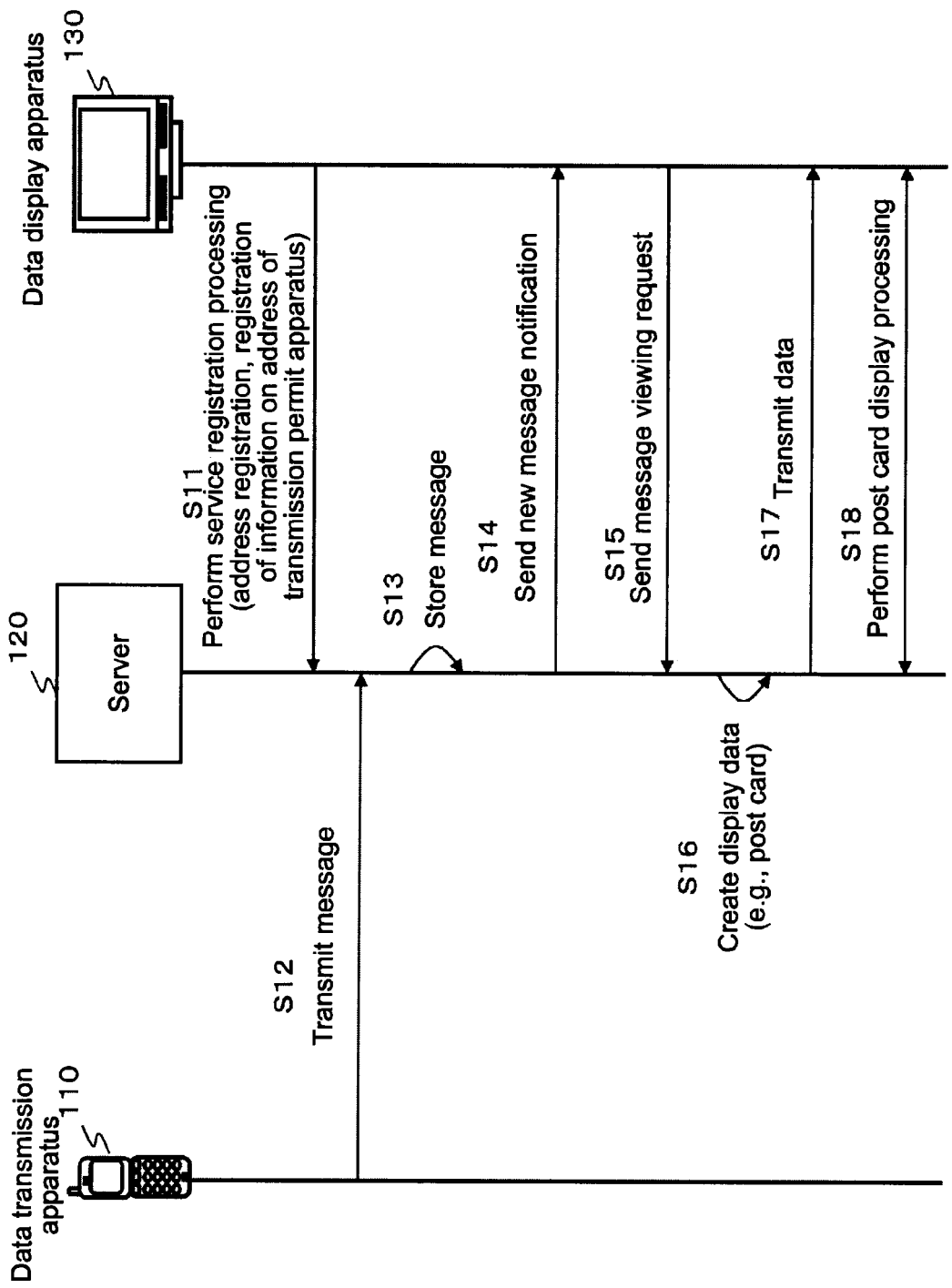
FIG. 3 is a diagram for explaining a communication sequence executed among a data transmission apparatus, the server, and a data display apparatus.

Next, a communication processing sequence that is performed among the data transmission apparatus 110, the server 120, and the data display apparatus 130 will be described with reference to FIG. 3. In FIG. 3, the data transmission apparatus 110, the server 120, and the data display apparatus 130 are displayed as in the case of FIG. 1.

First, in Step S11, the data display apparatus 130 performs, on the server 120, the service registration processing such as the address registration of the data display apparatus 130 itself. It should be noted that in the service registration processing, an address of, e.g., an apparatus that is permitted to transmit a message can be registered in addition to the address of the apparatus itself. For example, when only the data transmission apparatus 110 is registered as the apparatus that is permitted to transmit the message, a message from another apparatus is rejected by the server 120 and is not stored in the storage section 121 of the server 120.

In Step S12, the message is transmitted from the data transmission apparatus 110 such as a cellular phone. The image taken by the data transmission apparatus 110 such as the cellular phone is attached to the message.

The transmitted message is received by the server 120. In Step S13, the server 120 stores the message in the storage section 121 managed by the server 120. For example, as described above with reference to FIG. 2, the message is stored in corresponding one of the storage areas sectioned for each of the message transmission destination addresses.

In Step S14, a new message notification indicating that a new message has arrived is transmitted to the data display apparatus 130 and is displayed on the data display apparatus 130. For example, a notification of "you've got a new mail" is displayed on the data display apparatus 130.

As described above, the data display apparatus 130 performs the polling processing of accessing the server 120 at the predetermined time intervals and confirms whether the new message has reached the apparatus itself (data display apparatus 130). In a case where the fact that the new message has reached the apparatus itself (data display apparatus 130) is confirmed in the polling processing, the new message notification of Step S14 is performed.

The user who is watching the TV program on the data display apparatus 130 gets the notification and confirms that the new message has arrived. When the user wants to view the message, the message processing application is started, and a message viewing request is transmitted to the server 120 in Step S15. It should be noted that, regardless of whether the new message has arrived or not, the data display apparatus 130 starts the message processing application at the arbitrary timing as described above and can transmit the message viewing request to the server 120.

Upon reception of the message viewing request, the server 120 obtains the message from the storage section 121 and creates the display data, that is, the post card to be provided to the data display apparatus 130 in Step S16.

As described above, in the post card as the display data corresponding to the read message, the text included in the message and the image such as the picture attached to the message are disposed on the predetermined template. Meanwhile, the display data corresponding to the unread message indicates only the message transmission destination/source information in a form of the post card.

In Step S17, the display data is provided to the data display apparatus 130. In Step S18, on the data display apparatus 130, the data provided from the server 120, such as the display data constituted of a plurality of post cards, is displayed.

In addition, in Step S18, the user on the data display apparatus 130 side operates an operation section of a remote controller (TV remote controller) compliant with the data display apparatus 130 and performs an opening processing of the unread post card, an enlargement display processing of the read post card, or the like.

(3. Display Data in Data Display Apparatus and Example of Processing with Respect to Display Data)

Figure 4:
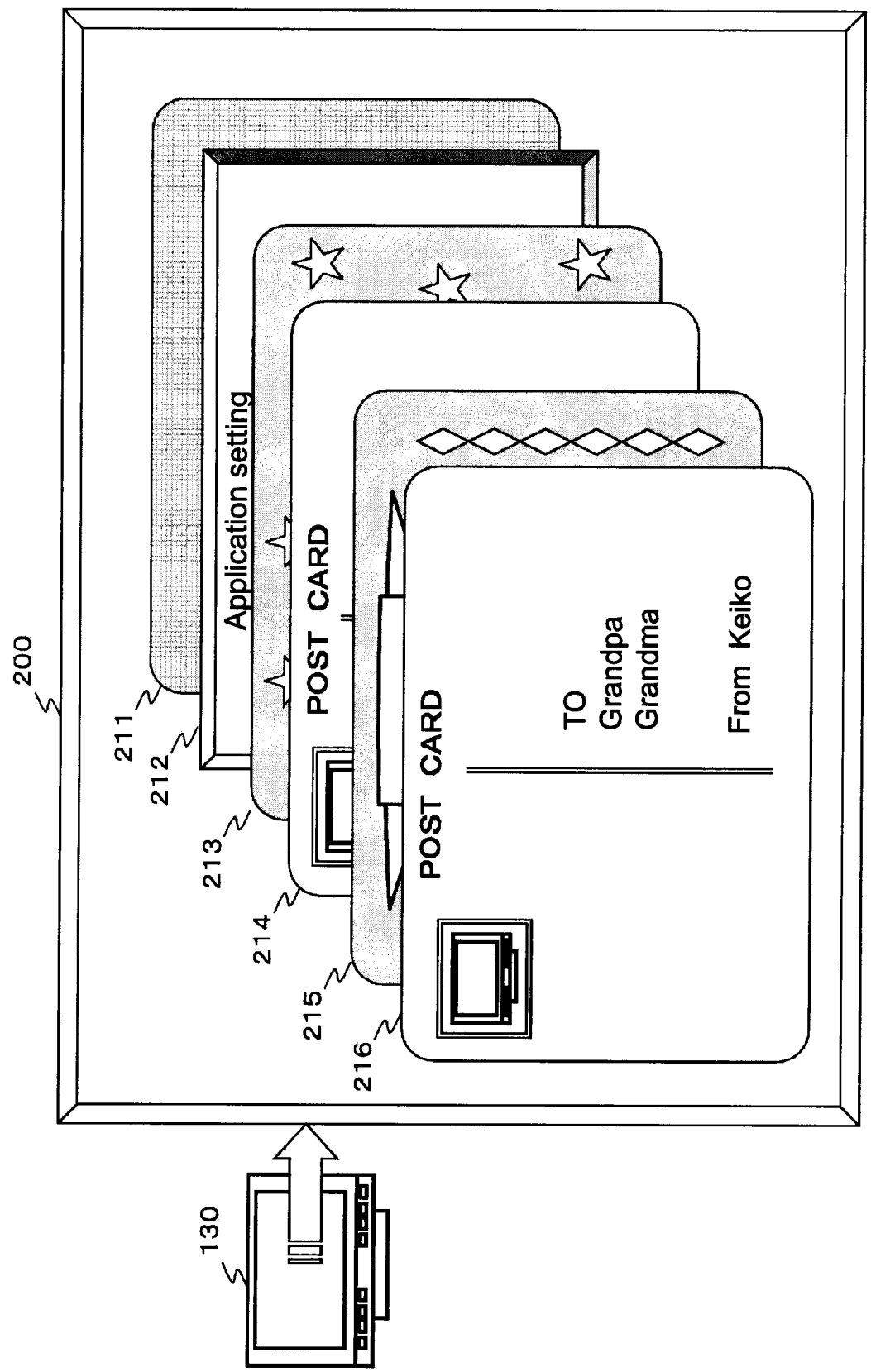
FIG. 4 is a diagram showing a display example of a card list constituted of post cards that uses templates associated with messages by the server.

FIG. 4 is a diagram showing an example of the display data provided to the data display apparatus 130 from the server 120. Display data 200 shown in FIG. 4 is an example of data displayed on the display section of the data display apparatus 130 in a case where the data display apparatus 130 makes the message viewing request to the server 120. The display data is a card list in which a plurality of messages are set in the form of post cards. In the plurality of messages, an address corresponding to the data display apparatus 130 is set as an address of the message transmission destination.

As shown in FIG. 4, the card list is displayed in the display form in which the plurality of post cards are overlapped.

The post cards displayed have the following form.

The read messages are post cards in each of which a message main body (text) included in the message and an image such as a picture attached to the message are disposed on the predetermined template.

The read messages correspond to post cards 211, 213, and 215 shown in FIG. 4.

In addition, the unread messages are post cards in each of which only a message transmission destination/source information is displayed.

The unread messages correspond to post cards 214 and 216 shown in FIG. 4.

Further, the card list includes an application setting card 212. The application setting card 212 is selected by the user when a processing of setting the message processing application or changing the setting thereof is performed, for example.

The user on the data display apparatus 130 side operates the remote controller (TV remote controller) compliant with the data display apparatus 130, selects desired data (post card or application setting card) from the card list displayed, and can perform a processing on the selected data. For example, the user operates a remote controller 300 as shown in FIG. 5.

By operating a left button 301 or a right button 302 of the remote controller 300, the data selected from the display data of the data display apparatus 130 can be shifted in a direction indicated by an arrow 311 or 312 shown in FIG. 5. That is, by operating the left button 301 or the right button 302, it is possible to reshuffle the post cards and scroll page by page (i.e., move the post cards to the front by turns). When a decision button 303 is pressed in a state where any piece of data is selected, the processing with respect to the selected data can be started.

For example, any one of the post cards 211, 213, and 215 shown in FIG. 4 is selected and can be enlarged and displayed. Alternatively, the unread messages 214 and 216 are selected and can be subjected to an opening processing. As a result of the opening processing, a document (text) included in the message and an image attached thereto are laid out on the template corresponding to the read message stored in the server 120 and displayed in the form of the post card corresponding to the read message. The post card in which the message main body (text) and the image such as the picture attached to the message are disposed on the predetermined template is displayed.

In a case where the application setting card 212 is selected, the processing of setting the message processing application or changing the setting can be performed, for example.

Figure 6:
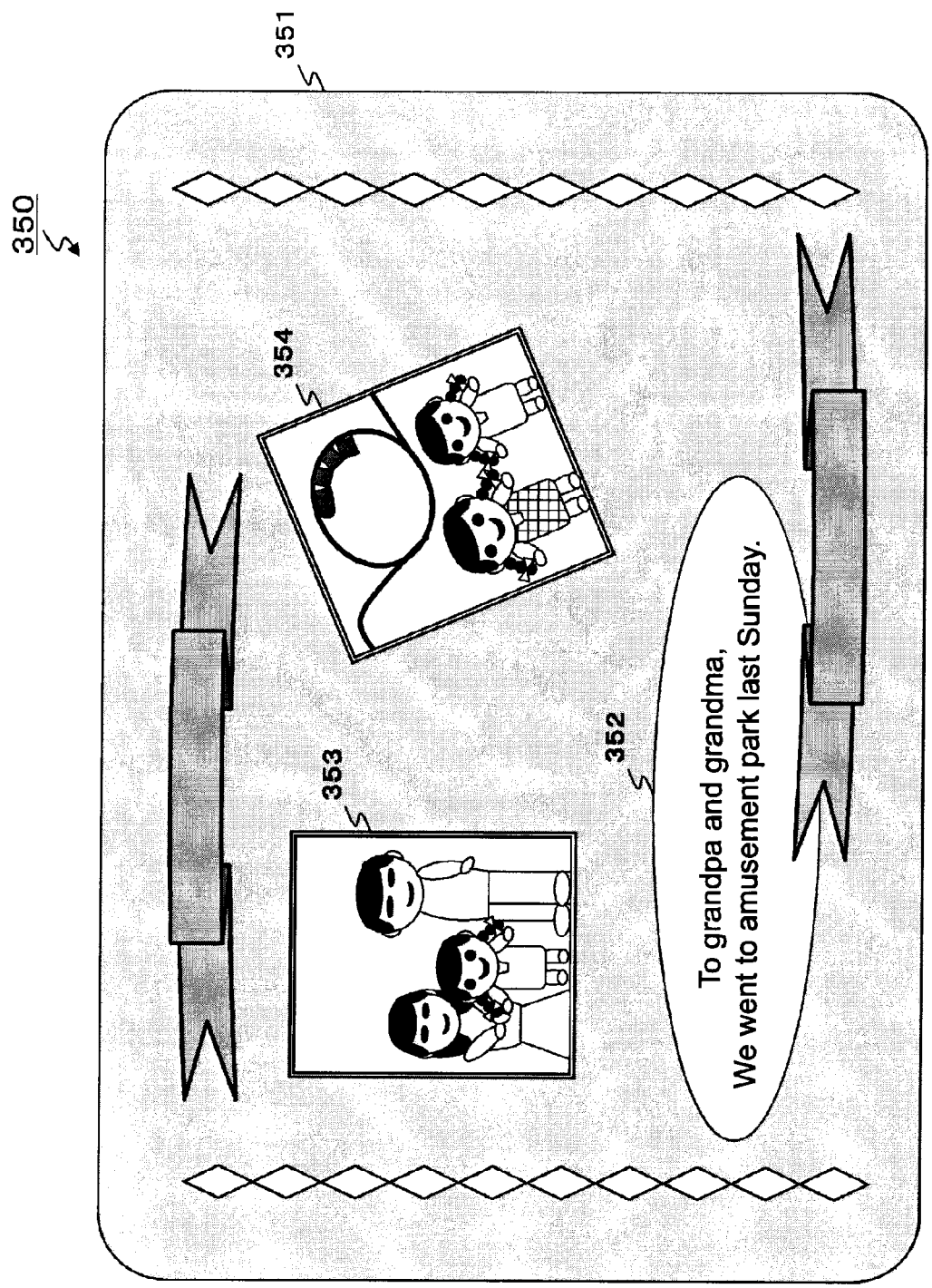
FIG. 6 is a diagram for explaining an example of the post card that uses the template corresponding to the message by the server.

When any one of the opened post cards 211, 213, and 215 shown in FIG. 4 is selected and the decision button is pressed, the selected post card is enlarged and displayed. In this post card, a message main body (text) and an image such as a picture attached to the message are disposed on the predetermined template. FIG. 6 is a diagram showing an example of a post card 350 enlarged and displayed. As shown in FIG. 6, in the post card 350, a message main body (text) 352 included in the message transmitted from the data transmission apparatus 110 and pieces of image data 353 and 354 such as pictures are disposed on a template 351 that is variously designed in advance.

The template is data stored in advance in the storage section 121 of the server 120. The server 120 stores a large number of templates having various designs in the storage section 121 thereof. For example, when the user on the data display apparatus 130 side performs the opening processing of the message, the server 120 selects one from the large number of templates held in the server 120 at random or based on information obtained from the information included in the message, and creates a post card in which the document included in the message and the image attached thereto are disposed on the template.

The server 120 provides the created post card corresponding to the message to the data display apparatus 130. It should be noted that, to the message once opened, identification information (flag) indicating that the message has already been read is set thereafter. The read message is stored in the storage section 121 of the server 120 along with the identification information (flag) indicating that it is the read message and link information with the template used for creating the post card. In the same way, to the unread information, identification information indicating that the message is not yet read is set and stored in the storage section 121. To the unread message, the template displays only the message transmission destination/source information as indicated in the post card 216 shown in FIG. 4 is set as link information.

It should be noted that the creation processing of the post card corresponding to the message by the server 120 may be performed at a timing of the message opening processing performed by the user on the data display apparatus 130 side or at a timing of the message reception processing from the data transmission apparatus 110.

The post card creation processing performed by the server 120 includes a selection processing of the template corresponding to the unread message and a selection processing of the template corresponding to the read message.

The server 120 stores, in the storage section 121 thereof, various kinds of templates having various designs as the templates corresponding to the read message. The server 120 selects one from the large number of templates as the template to be associated with the message. When the template selection processing is executed, the server 120 sets the template selected with respect to the message, which is stored in the storage section 121, as the link information corresponding to the message and stores the template into the storage section. In addition, the template corresponding to the unread message displays only the message transmission destination/source information indicated on the post card 216 shown in FIG. 4. The number of templates may be only one, but the template may be selected from a plurality of templates. Also, the template of the unread message is set as the link information corresponding to the message and stored in the storage section.

For the read message, the server 120 associates, with the message, the link information with the template corresponding to the read message and the identification information (flag) indicating that the message has already been read, and stores the associated information items in the storage section 121.

For the unread message, the server 120 associates, with the message, the link information with the template corresponding to the unread message and the identification information (flag) indicating that the message is not yet read, and stores the associated information items in the storage section 121.

It should be noted that, for the unread message, the template corresponding to the unread message may be selected in advance in order to use the template after the opening processing. In this case, link information with the template corresponding to the read message, which is selected in advance, may be stored in the storage section 121 with the link information being associated with the unread message.

In the case where the card list shown in FIG. 4 is created, the server 120 references the identification information (flag) corresponding to each message and determines the display form.

That is, the server 120 creates the display data in the different forms of the post cards for each of the read message and the unread message and provides the display data to the data display apparatus 130. Specifically, the read message is indicated on the post card in which the message main body (text) and the image data such as a picture are laid out on the template corresponding to the read message. Meanwhile, the unread message is indicated on the post card in which the template that displays only the message transmission destination/source information is used.

In the case where the user on the data display apparatus 130 side performs the opening processing on the unread message, the server 120 performs the following processing.

That is, in a case where the template corresponding to the read message has already been associated with the message as the link data, the server uses the template corresponding to the read message associated, creates the post card in which the message main body (text) and the image are disposed on the template, and provides the post card to the data display apparatus 130. In addition, the server 120 sets the identification information (flag) for judging whether the message is opened or unread to the opened state and stores the identification information in the storage section 121.

Further, in a case where the template corresponding to the read message linked to the newly opened message is not set at a time when the user on the data display apparatus 130 side performs the opening processing of the unread message, the server 120 performs the following processing.

The server 120 performs the selection processing of the template corresponding to the read message, which corresponds to the message that has been newly subjected to the opening processing. Then, the server 120 creates, by using the selected template, the post card in which the message main body (text) included in the message and the image are disposed on the template and provides the post card to the data display apparatus 130. In addition, the server 120 sets the link information indicating that the selected template is used as the template corresponding to the message, sets the identification information (flag) for judging whether the message is opened/unread to the opened state, and stores the set information in the storage section 121.

The message transmitted to the data display apparatus 130 is subjected to the above-described processings and displayed as the card list in which the plurality of post cards are overlapped as shown in FIG. 4.

The user on the data display apparatus 130 side can sequentially select one from the plurality of post cards by operating the remote controller 300 described above with reference to FIG. 5 and enlarge and display the post card. In this case, as to the read message, it is possible to confirm the message main body included in the message and the image such as the picture in the form of the post card without performing a reopening processing of the message.

In other words, only by selecting the post card by using the left button 301 or the right button 302 of the remote controller 300 and operating the decision button 303, it is possible to confirm the message main body included in the message and the image such as the picture attached thereto (shown in FIG. 6) in the form of the post card. The user can confirm the message main body and the image attached to the message without performing the reopening processing of the message, with the result that the burden on the user can be reduced.

(4. Selection Processing of Template Corresponding to Message)

Next, a selection processing of a template corresponding to a message that is performed by the server 120 will be described in detail. As described above, the server 120 stores the large number of templates having different designs in the storage section 121 thereof.

When the server 120 receives the message from the data transmission apparatus 110 and stores the message in the storage section 121, or when the user on the data display apparatus 130 side performs the opening processing of the message, the server 120 performs the selection processing of the template to be corresponded to the message.

The server 120 performs the template selection processing from the large number of templates stored in the storage section 121 of the server 120 at random or based on the information included in the message. On the selected template, an image and a document included in the message are laid out, thereby creating the post card.

As described above, the server 120 stores, in the storage section 121, the large number of templates having the various designs as the templates corresponding to unread messages or read messages. The server 120 selects the template to be corresponded to the message and sets each selected template as the link information of each message. After that, in response to the message viewing request from the data display apparatus 130, the server 120 creates the post card in which the document and the image as component information items of the message are laid out on the selected template, and provides the post card to the data display apparatus 130.

For example, the server 120 analyses the information included in the message and uses the analysis information to select the template that is judged to be appropriate for the message. As the information that is included in the message and is available for selecting the template, the following information items can be used.

Character strings in the title of the message or in the message main body: for example, "entrance ceremony", "overseas trip", "mountain", "sea", "flower", "place name (Tokyo, America, Hawaii, etc.)", or "seasonal word (e.g., spring, summer, etc.)"

Those character strings can be used as keywords for selecting the template.

Alternatively, by obtaining and using attribute information that is set so as to correspond to the image such as the picture attached to the message, it is possible to select the template.

For example, Exif data created as a picture file includes, as the attribute information, "image-taking date and time information" and "image-taking positional information" that is obtained by using a GPS, and includes "face detection information", "smile detection information", and the like in a case where functions of a face detection and a smile detection are equipped as camera functions. Based on the attribute information items corresponding to the image, the template selection is performed.

A specific processing example in a case where the server 120 selects the template corresponding to the message will be described with reference to FIG. 7.

Figure 7:
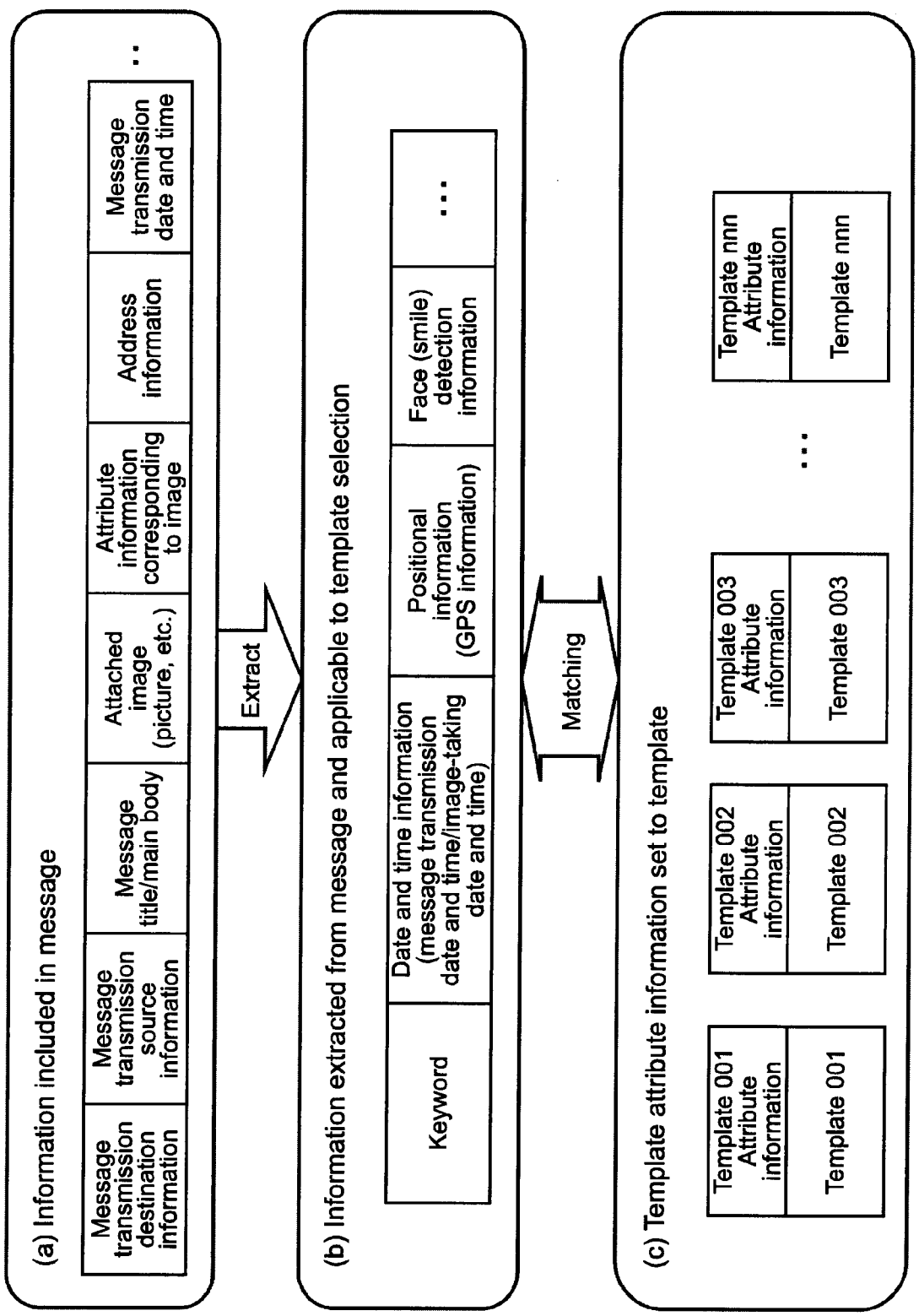
FIG. 7 is a diagram for explaining a template selection processing in which information that constitutes the message is used, the template selection processing being executed by the server.

FIG. 7 shows the following information items.

(a) information included in the message (b) information extracted from the message and applied to the template selection (c) template attribute information set to the template The "(a) information included in the message" includes the following information items.

(a1) message transmission destination information (To): for example, "Grandpa and grandma"

(a2) message transmission source information (From): for example, "Keiko"

(a3) message main body: for example, "How are you . . . "

(a4) image attached to message: for example, one to three pictures (a5) message transmission source address (a6) message transmission destination address (a7) message transmission date and time information The server 120 performs a processing of extracting the "(b) information applied to the template selection" shown in FIG. 7 from the "(a) information included in the message", specifically, included in the message for which the template is selected.

The "(b) information extracted from the message and applied to the template selection" includes the following information items, for example.

(b1) keyword extracted from the title and main body of the message (b2) date and time information, specifically, for example, a message transmission date and time or an image-taking date and time that is obtained from the attribute information of the attached image (b3) positional information indicating an image-taking position obtained from the attribute information of the attached image (b4) face detection information or smile detection information obtained from the attached image or the attribute information of the attached image The server 120 obtains those information items as the template selection information from the message.

It should be noted that the "(b4) face detection information or smile detection information" may be obtained from the attribute information (for example, Exif file) of the attached image, or the server 120 itself may execute the image analysis of the attached image and judge whether a face (or a smile) area is included in the image, to thereby select the template based on the judgment result.

When the server 120 obtains the "(b) information applied to the template selection" shown in FIG. 7 from the message, the server 120 performs the template selection processing based on those information items. In the storage section 121 of the server 120, the large number of templates created are stored in advance. For each of the templates, template attribute information to be applied to the template selection processing is set in advance.

The template attribute information items includes information items such as words of "spring", "entrance ceremony", "sea", "April", "May", "America", "fun", and the like, the positional information (longitude/latitude), and regional information (Hokkaido, Hi., etc.).

Those information items are applied to the template selection.

The server 120 performs a matching processing of the "(b) information applied to the template selection" and the "(c) template attribute information" that are shown in FIG. 7 with each other. The matching processing is performed in accordance with a predetermined sequence, to select one template.

For example, as a first processing, a matching processing of a keyword included in the "(b) information extracted from the message and applied to the template selection" and a word recorded as the "(c) template attribute information". When a template having attribute information matched is detected, the template is selected as the template corresponding to the message.

In this matching processing of the keywords, in a case where the template is not detected, the following processing is performed as a second processing. That is, by using the image-taking date and time information, a template whose attribute information has the date and time, the month, or the season corresponding to the image-taking date and time is selected as the template corresponding to the message.

Alternatively, a processing of selecting, as the template corresponding to the message, a template whose attribute information has the highest match rate with the "(c) template attribute information" may be performed by applying all the "(b) information extracted from the message and applied to the template selection".

Figure 8:
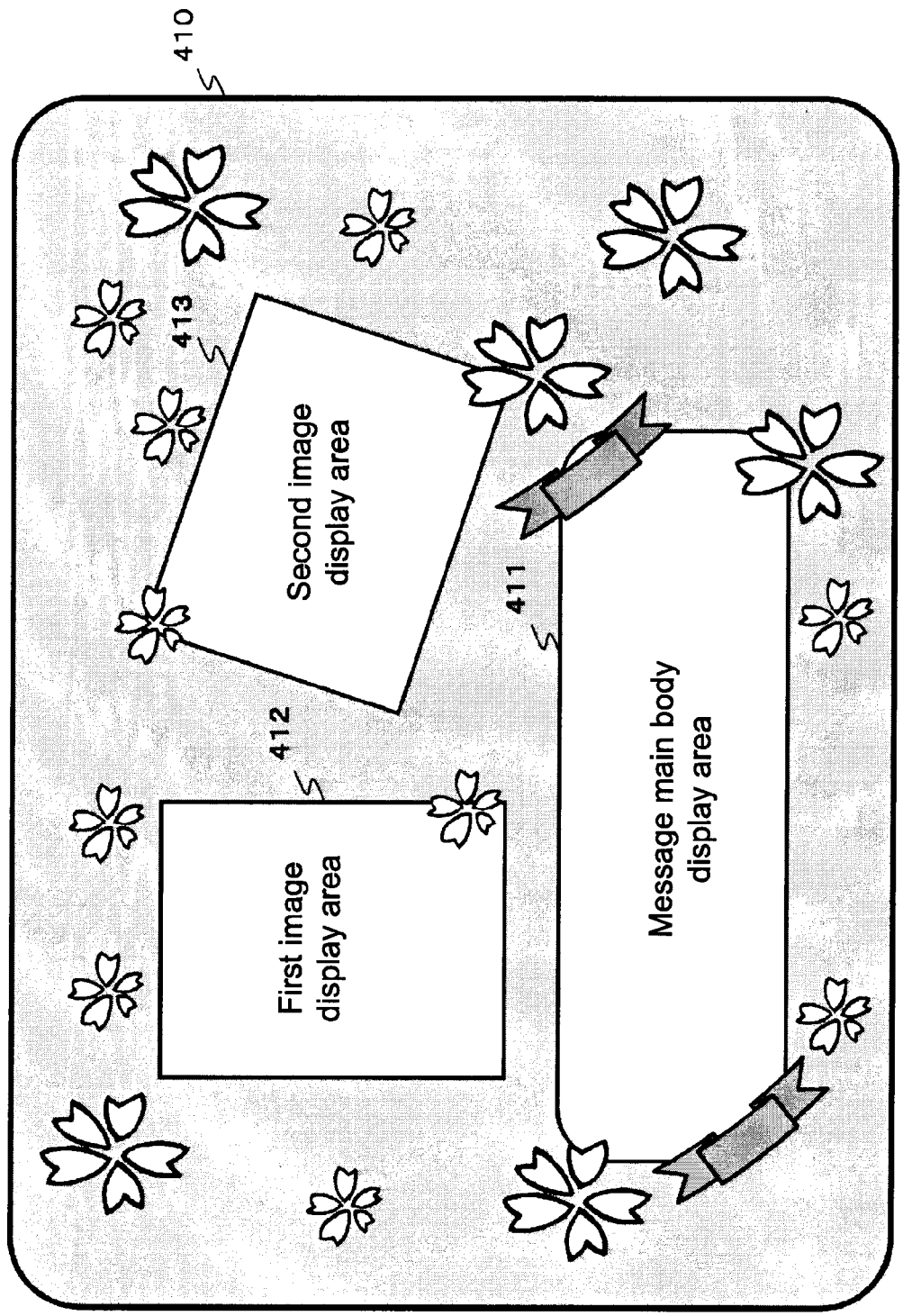
FIG. 8 is a diagram showing an example of a template selected by the template selection processing in which the information that constitutes the message is used, the template selection processing being executed by the server.
Figure 9:
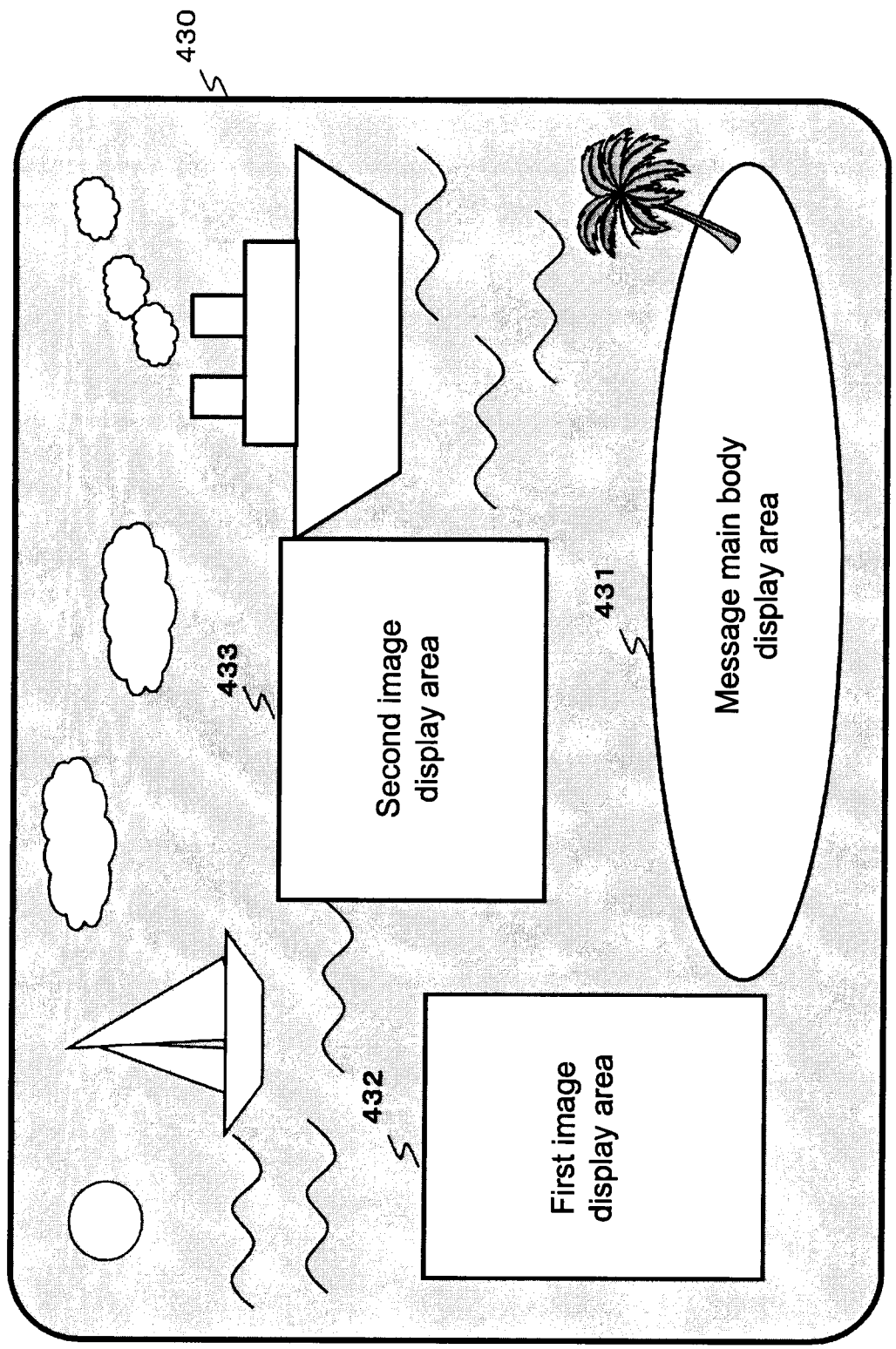
FIG. 9 is a diagram showing another example of a template selected by the template selection processing in which the information that constitutes the message is used, the template selection processing being executed by the server.

FIGS. 8 and 9 are diagrams each showing an example of the post card that uses the selected template.

FIG. 8 shows an example of the template selected as one corresponding to the message having a keyword such as "April", "spring", "entrance ceremony", and "cherry blossoms". By using the keyword, the image-taking date and time information, the message transmission date and time information, or the like obtained from the attribute information of the image, the title of the message, or the message main body, a template 410 having a design of petals of the cherry blossoms is selected.

The template 410 is stored in the storage section 121 of the server 120 along with the attribute information of the template. The attribute information of the template 410 is set to include data of the words such as "April", "spring", "entrance ceremony", and "cherry blossoms" that are the above search keywords. The server 120 performs the keyword matching processing to which the those words are applied, and thus can select the template 410 shown in FIG. 8 as the template corresponding to the message having the keyword such as "April", "spring", "entrance ceremony", and "cherry blossoms".

As shown in FIG. 8, the template 410 includes areas to which message-including information is applied, such as a message main body display area 411, a first image display area 412, and a second image display area 413. At a time when the post card is created, the message main body and the images attached to the message are applied to the respective areas, with the result that the post card is created and provided to the data display apparatus 130. On the display section of the data display apparatus 130, the images and the message main body included in the message transmitted from the message transmission apparatus 110 are applied to the template 410 shown in FIG. 8 and displayed.

FIG. 9 shows an example of the template selected as one corresponding to the message having a keyword such as "August", "summer", and "sea". By using the keyword, the image-taking date and time information, the message transmission date and time information, or the like obtained from the attribute information of the image, the title of the message, or the message main body, a template 430 having a design of the sea, a ship, a yacht, an island, or the like is selected.

The template 430 is stored in the storage section 121 of the server 120 along with the attribute information of the template. The attribute information of the template 430 is set to include data of the words such as "August", "summer", and "sea" that are the above search keywords. The server 120 performs the keyword matching processing to which the those words are applied, and thus can select the template 430 shown in FIG. 9 as the template corresponding to the message having the keyword such as "August", "summer", and "sea".

As in the case of FIG. 8, the template 430 includes areas to which message-including information is applied, such as a message main body display area 431, a first image display area 432, and a second image display area 433. At a time when the post card is created, the message main body and the images attached to the message are applied to the respective areas, with the result that the post card is created and provided to the data display apparatus 130. On the display section of the data display apparatus 130, the images and the message main body included in the message transmitted from the message transmission apparatus 110 are applied to the template 430 shown in FIG. 9 and displayed.

The storage section 121 of the server 120 stores the large number of templates applied to the template selection processing. That is, the storage section 121 of the server 120 stores, along with the template attribute information, the plurality of variously designed templates used for displaying the content (message) including the document or the image in the state where the content is laid out on the template having a predetermined design. The control section of the server 120 uses the component information of the content (message) as the search key, thereby performing the matching processing with the template attribute information, with the result that the template whose template attribute information has the highest match rate is selected as the template corresponding to the content (message), which is to be applied to the content display.

Figure 10:
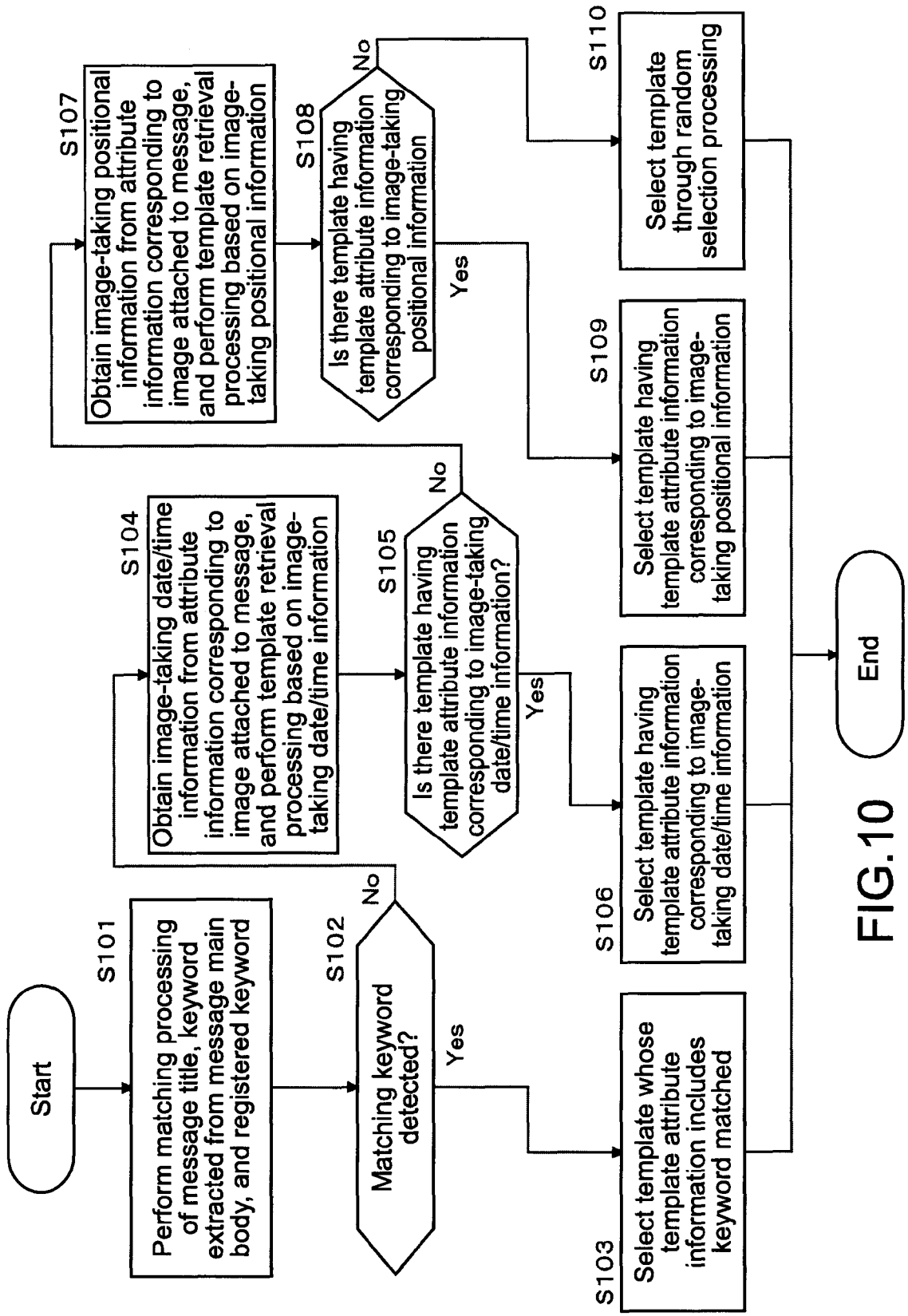
FIG. 10 is a flowchart for explaining a sequence of the template selection processing executed by the server.

An example of the sequence of the template selection executed by the server 120 will be described with reference to the flowchart shown in FIG. 10. The processing that follows the flowchart of FIG. 10 is performed by the control section as a program execution section of the server 120. The program for causing the processing of the flowchart of FIG. 10 to be executed is stored in the storage section of the server 120.

It should be noted that the flowchart shown in FIG. 10 is an example of the sequence of the template selection executed by the server 120 and the following three processings are sequentially executed.

Keyword matching processing as a first template selection processing

Processing that uses the image-taking date and time information as a second template selection processing Processing that uses the image-taking positional information as a third template selection processing As a result, the template selection processing is performed. In a case where the template fails to be selected by executing those three processings, the template corresponding to the message is selected at random.

Steps of the flowchart shown in FIG. 10 will be described.

First, in Step S101, the matching processing of the title of the message to which the template is to be corresponded, the keyword extracted from the message main body, and the word registered as the attribute information associated with the template.

In Step S102, it is judged whether a matching keyword is detected. In a case where a template in which the matching keyword is registered as the template attribute information is detected (Yes in Step S102), the process proceeds to Step S103.

In Step S103, the template whose template attribute information includes the matching keyword is selected as the template corresponding to the message, to terminate the processing.

On the other hand, in a case where the matching keyword is not detected in Step S102 (No in Step S102), the process proceeds to Step S104.

In Step S104, the image-taking date and time information is obtained from the attribute information of the image attached to the message, and the template retrieval processing is executed based on the image-taking date and time information obtained. For example, in a case where the image-taking date and time information is April 4, the server 120 retrieves a template whose attribute information includes "April". It should be noted that the control section of the server may perform a processing of expanding a retrieval range from the information of "April 4" (image-taking date and time) to the information of "spring", "entrance ceremony", or the like, in addition to the information of "April", and perform the template retrieval by applying the retrieval information items.

In Step S105, it is judged whether a template whose template attribute information includes date and time information that is the same as or close to the image-taking date and time information of the image attached to the message or includes information expanded from the image-taking date and time information is detected.

In Step S105, in a case where it is judged that the template whose template attribute information includes the date and time information that is the same as or close to the image-taking date and time information of the image attached to the message or includes the information expanded from the image-taking date and time information is detected (Yes in Step S105), the process proceeds to Step S106.

In Step S106, the template whose template attribute information includes the date and time information that is the same as or close to the image-taking date and time information of the image attached to the message or includes the information expanded from the image-taking date and time information is selected as the template corresponding to the message, to terminate the processing.

On the other hand, in Step S105, it is judged that the template whose attribute information includes the date and time information that is the same as or close to the image-taking date and time information of the image attached to the message or includes the information expanded from the image-taking date and time information is not detected (No in Step S105), the process proceeds to Step S107.

In Step S107, the image-taking positional information is obtained from the attribute information of the image attached to the message, and the template retrieval processing is executed based on the image-taking positional information obtained. For example, as the image-taking position, longitude/latitude information of "longitude of xx degrees yy minutes and latitude of pp degrees qq minutes" is obtained. By using the longitude/latitude information, the template whose template attribute information includes the positional information that is close thereto is retrieved. It should be noted that the control section of the server may perform the template retrieval processing by obtaining the regional information of a place name such as "Tokyo", "America", and "Hawaii" from the longitude/latitude information and using the regional information in accordance with the prepared program.

In Step S108, it is judged whether the template whose template attribute information includes the positional information that is the same as or close to the image-taking positional information of the image attached to the message or includes the information expanded from the image-taking positional information is detected.

In a case where it is judged that the template whose template attribute information includes the positional information that is the same as or close to the image-taking positional information of the image attached to the message or includes the information expanded from the image-taking positional information is detected in Step S108 (Yes in Step S108), the process proceeds to Step S109.

In Step S109, the template whose template attribute information includes the positional information that is the same as or close to the image-taking positional information of the image attached to the message or includes the information expanded from the image-taking positional information is selected as the template corresponding to the message, to terminate the processing.

On the other hand, in a case where it is judged that the template whose template attribute information includes the positional information that is the same as or close to the image-taking positional information of the image attached to the message or includes the information expanded from the image-taking positional information is not detected in Step S108 (No in Step S108), the process proceeds to Step S110.

In Step S110, through a random selection processing, the template is selected, and the selected template is determined as the template corresponding to the message, to terminate the processing.

As described above, the server 120 selects the template that is appropriate for the message and applied to the creation of the post card by using the various information items included in the message.

It should be noted that the processing flow described with reference to FIG. 10 is an example of the template selection processing. As described above with reference to FIG. 7, the following information items can be applied to the template selection.

(1) keyword extracted from the title and main body of the message (2) date and time information such as the message transmission date and time and the image-taking date and time obtained from the attribute information of the attached image (3) positional information that indicates the image-taking position, which is obtained from the attribute information of the attached image (4) face detection information or smile detection information obtained from the attached image or the attribute information of the attached image The server 120 obtains those information items from the message as the template selection information and uses one or more of the information items in combination, with the result that the optimal template corresponding to the message can be selected.

(5. Regarding Hardware Structure of Each Apparatus)

Finally, with reference to FIG. 11, an example of a hardware structure of each of the data transmission apparatus 110, the server 120, and the data display apparatus 130 will be described.

Figure 11:
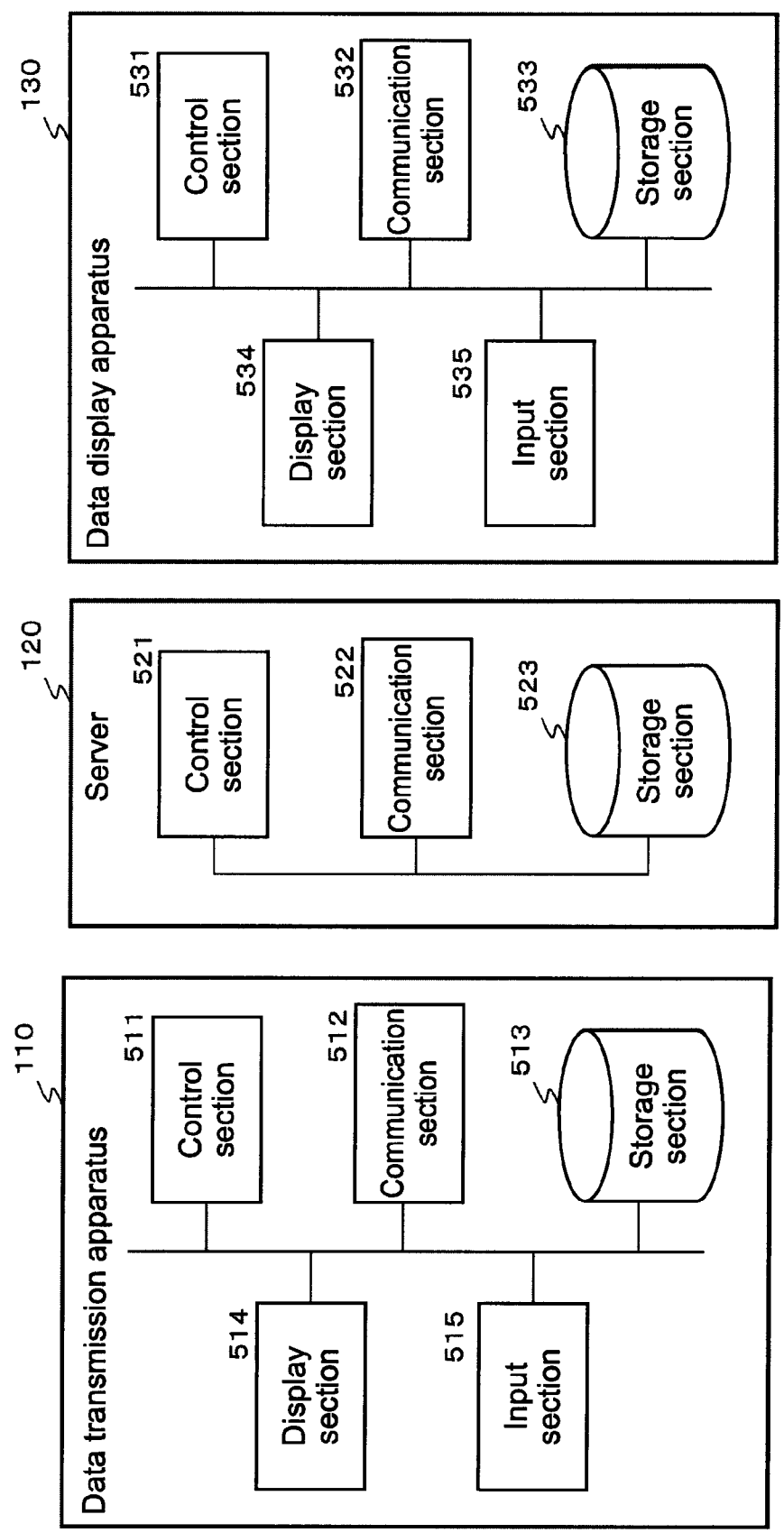
FIG. 11 is a diagram for explaining a hardware structure of each of the data transmission apparatus, the server, and the data display apparatus.

As shown in FIG. 11, the data transmission apparatus 110 includes a control section 511, a communication section 512, a storage section 513, a display section 514, and an input section 515. The control section 511 performs data processings to which various programs are applied. The communication section 512 performs the communication via a network. The storage section 513 stores a program, a parameter, image data, and the like. The display section 514 displays an image or a user interface, for example. The input section 515 inputs information of an operation by the user. It should be noted that, in a case where the information can be input through a UI such as a touch panel UI, the display section is equipped with the input section.

The control section 511 of the data transmission apparatus 110 performs, in response to the user operation through the input section 515, processings of shooting and storing a photograph, creating a message, and transmitting a message to which an image is attached, for example. As described above, the transmission message is a message created in accordance with a format to which the following information can be input or set, for example.

Message transmission destination information (To): for example, "Grandpa and grandma"

Message transmission source information (From): for example, "Keiko"

Message main body: for example, "How are you . . . "

Image attached to message: for example, one to three pictures

Message transmission source address

Message transmission destination address

Next, the structure of the server 120 will be described. As shown in FIG. 11, the server 120 includes a control section 521, a communication section 522, and a storage section 523 (that corresponds to the storage section 121 shown in FIG. 1). The control section 521 performs data processings to which various programs are applied. The communication section 522 performs the communication via the network. The storage section 523 stores a program, a parameter, a message, an image data, information on a template that is applied to a post card, and the like.

The control section 521 of the server 120 stores the message received from the data transmission apparatus 110 to the storage section 523 and provides, in response to the viewing request from the data display apparatus 130, data that can be displayed in the form of the post card to the data display apparatus 130. In addition, the server 120 sets the various attribute information items with respect to the messages stored in the storage section 523, for example, the identification information for judging whether the message is read/unread, the link information with the template, and the like.

Further, as described above with reference to FIGS. 7 to 10, the control section 521 of the server 120 performs the processing of selecting the template applied to the creation of the post card corresponding to each of the messages based on the information items that constitute the message. It should be noted that the program of the template selection processing is stored in the storage section 523.

Next, the structure of the data display apparatus 130 will be described. As shown in FIG. 11, the data display section 130 includes a control section 531, a communication section 532, a storage section 533, a display section 534, and an input section 535. The control section 531 performs data processings to which various programs are applied. The communication section 532 performs the communication via the network. The storage section 533 stores a program, a parameter, image data, and the like. The display section 534 displays an image or a user interface, for example. The input section 535 inputs information of an operation by the user. It should be noted that the input section 535 corresponds to the remote controller 300 described above with reference to FIG. 5.

In response to the user operation through the input section 535, the control section 531 of the data display apparatus 130 performs various processings of outputting the message viewing request to the server 120, selecting the card from the card list shown in FIG. 4, enlarging and displaying the selected post card, opening the unread message, and setting the application, for example. Those processings are performed by executing the message processing application as the program stored in the storage section 533 by the controller 531 constituted of the CPU and the like.

Heretofore, the embodiment of the present invention is described by using the specific examples. However, those skilled in the art can of course modify or replace the embodiment of the present invention without departing from the gist of the present invention. That is, the embodiment of the present invention is described above as an example, and therefore the present invention should not be subjected to limited interpretation. The gist of the present invention should be understood by taking the appended claims into consideration.

In addition, the series of processings described in this specification can be executed by using hardware, software, or a composite structure of the hardware and software. When the processings are executed by using the software, a program on which the processing sequence is recorded can be installed in a memory in a computer incorporated in a dedicated hardware and executed. Alternatively, the program can be installed in general-purpose computer capable of performing various processings and executed. For example, the program can be recorded on a recording medium in advance and installed to the computer from the recording medium. In addition, the program is received via a network such as a LAN (local area network) or the Internet and can be installed to the recording medium such as a build-in hard disk.

It should be noted that the various processings described in this specification may be executed in the chronological order of the description, or may be executed in parallel or separately, as necessary or depending on the processing abilities of the apparatuses that perform the processings. Further, the system in this specification refers to a logical composite structure of the plurality of apparatuses. Therefore, the apparatuses of the respective structures are not limited to be disposed in the same casing.

As described above, according to the structure of the embodiment of the present invention, performed is the selection processing of the optimal template used for displaying the document and the image included in the contents (messages) transmitted via, e.g., the network by laying out the document and the image on the template having the predetermined template. The information of the elements of the content, which are included in the message, such as the word, the image-taking date and time information, and the image-taking positional information is extracted, and the matching processing of those information items as the search key and the template attribute information. The template whose attribute information has the highest match rate is selected as the template corresponding to the content, which is used for displaying the content. Through this processing, the selection of the optimal template for displaying the content such as the message is realized.

The present application contains subject matter related to that disclosed in Japanese Priority Patent Application JP 2009-016223 filed in the Japan Patent Office on Jan. 28, 2009, the entire content of which is hereby incorporated by reference.

What is claimed is:

1. An information processing apparatus, comprising:
a storage section configured to store a plurality of templates with template attribute information, each template configured to be capable of being applied to a display of a content of a message with the content being laid out on the template, and each template being displayed in a form of a post card on a display device; and a control section configured to cause the display device to display, for an unopened message, only at least one of message transmission destination or source information on the post card;

perform an opening process, in response to a user's selection of the unopened message, to cause the display device to switch from displaying only at least one of message transmission destination or source information to displaying the content of the message on the post card; and cause the display device to display, in response to the user's selection of a previously read message that has been subjected to the opening process, the post card showing the content of the previously read message and without showing the message transmission destination or source information, to enable the user to view the content of the previously opened message without performing the opening process again.

2. The information processing apparatus according to claim 1, wherein the control section extracts a search keyword from document information included in the content, performs a matching processing of the extracted search keyword with data included in the template attribute information, and selects, as the template to be applied to the display of the content, the template whose template attribute information having higher match rate than other templates.

3. The information processing apparatus according to claim 2, wherein the control section extracts metadata of the image included in the content, performs the matching processing of the extracted metadata with data included in the template attribute information, and selects, as the template to be applied to the display of the content, the template whose template attribute information having the higher match rate than the other templates.

4. The information processing apparatus according to claim 3, wherein the metadata of the image is image-taking date and time information of the image included in the content, and wherein the control section performs the matching processing of the image-taking date and time information with the data included in the template attribute information, and selects, as the template to be applied to the display of the content, the template whose attribute information being judged to be one of the same image-taking date and time information and a similar image-taking date and time information.

5. The information processing apparatus according to claim 3, wherein the metadata of the image is image-taking positional information of the image included in the content, and wherein the control section performs the matching processing of the image-taking positional information with the data included in the template attribute information, and selects, as the template to be applied to the display of the content, the template whose attribute information being judged to be one of the same image-taking positional information and a similar image-taking positional information.

6. The information processing apparatus according to claim 2, wherein the information processing apparatus is a relay server for the message that is transmitted and received among a plurality of communication apparatuses, wherein the control section performs the matching processing using the component information of the message as the search key, selects, as the template to be applied to the display of the content, the template whose template attribute information having the higher match rate than the other templates, and provides, to a message reception apparatus, display data in the form of the post card in which the component information of the message is laid out on the selected template.

7. An information processing method executed in an information processing apparatus, comprising:

selecting, by a control section, a template to be applied to a display of a content of a message, the content including at least one of a document or an image, the template having a predetermined design, and being displayed in a form of a post card on a display device;

causing, by the control section, the display device to display, for an unopened message, only at least one of message transmission destination or source information on the post card;

performing, by the control section, an opening process, in response to a user's selection of the unopened message, to cause the display device to switch from displaying only at least one of message transmission destination or source information to displaying the content of the message on the post card; and causing, by the control section, the display device to display, in response to the user's selection of a previously read message that has been subjected to the opening process, the post card showing the content of the previously read message and without showing the message transmission destination or source information, to enable the user to view the content of the previously opened message without performing the opening process again.

8. The information processing method of claim 7, further comprising:

setting link information indicating that the template is corresponding to the read or opened message; and setting link information indicating that the temperate corresponding to the unread or unopened message.

9. The information processing method of claim 8, further comprising:

setting identification information indicating whether a message has already been read or opened.

10. The information processing method of claim 8, further comprising:

storing at least one of the link information associated with the read or opened message or the link information associated with the unread or unopened message.

11. The information processing method of claim 9, further comprising:

storing the identification information with the link information associated with the read or opened message or the link information associated with the unread or unopened message.

12. A non-transitory computer-readable medium encoded with a program, which when executed by an information processing apparatus, causes the information processing apparatus to execute an information processing, the information processing comprising:

causing, by a control section, to select a template to be applied to a display of a content of a message, the content including at least one of a document or an image, and being laid out on the template, the template having a predetermined design, and being displayed in a form of a post card on a display device;

causing, by the control section, the display device to display, for an unopened message, only at least one of message transmission destination or source information on the post card;

performing, by the control section, an opening process, in response to a user's selection of the unopened message, to cause the display device to switch from displaying only at least one of message transmission destination or source information to displaying the content of the message on the post card; and causing, by the control section, the display device to display, in response to the user's selection of a previously read message that has been subjected to the opening process, the post card showing the content of the previously read message and without showing the message transmission destination or source information, to enable the user to view the content of the previously opened message without performing the opening process again.

13. The information processing apparatus of claim 1, wherein the control section further sets link information indicating that the template is corresponding to the read or opened message, and sets link information indicating that the temperate corresponding to the unread or unopened message.

14. The information processing apparatus of claim 13, wherein the control section further sets identification information indicating whether a message has already been read or opened.

15. The information processing apparatus of claim 13, wherein the storage section stores at least one of the link information associated with the read or opened message or the link information associated with the unread or unopened message.

16. The information processing apparatus of claim 14, wherein the storage section stores the identification information with the link information associated with the read or opened message or the link information associated with the unread or unopened message.

17. The non-transitory computer-readable medium of claim 12, the information processing further comprising:
    setting link information indicating that the template is corresponding to the read or opened message; and
    setting link information indicating that the temperate corresponding to the unread or unopened message.

18. The non-transitory computer-readable medium of claim 17, the information processing further comprising:
    setting identification information indicating whether a message has already been read or opened.

19. The non-transitory computer-readable medium of claim 17, the information processing further comprising:
    storing at least one of the link information associated with the read or opened message or the link information associated with the unread or unopened message.

20. The non-transitory computer-readable medium of claim 18, the information processing further comprising:
    storing the identification information with the link information associated with the read or opened message or the link information associated with the unread or unopened message.

\* \* \* \* \*